(12) United States Patent
De Lemos Junior et al.

(10) Patent No.: US 11,448,341 B2
(45) Date of Patent: Sep. 20, 2022

(54) PIPELAYING

(71) Applicant: Subsea 7 do Brasil Servicos Ltda, Niteroi (BR)

(72) Inventors: Luiz Carlos De Lemos Junior, Rio de Janeiro (BR); Joao Carlos Carvalho Gouveia, Rio de Janeiro (BR); Frederico Nicoletti de Fraga, Niteroi (BR)

(*) Notice: Subject to any disclaimer, the term of this patent is extended or adjusted under 35 U.S.C. 154(b) by 307 days.

(21) Appl. No.: 16/467,947

(22) PCT Filed: Dec. 8, 2017

(86) PCT No.: PCT/BR2017/050374
§ 371 (c)(1),
(2) Date: Jun. 7, 2019

(87) PCT Pub. No.: WO2018/102900
PCT Pub. Date: Jun. 14, 2018

(65) Prior Publication Data
US 2020/0088320 A1    Mar. 19, 2020

(30) Foreign Application Priority Data
Dec. 9, 2016 (GB) .................................. 1621012

(51) Int. Cl.
| F16L 1/16 | (2006.01) |
| F16L 1/20 | (2006.01) |
| F16L 1/26 | (2006.01) |
| F16L 41/02 | (2006.01) |

(52) U.S. Cl.
CPC .................... *F16L 1/20* (2013.01); *F16L 1/16* (2013.01); *F16L 1/26* (2013.01); *F16L 41/021* (2013.01)

(58) Field of Classification Search
CPC ....... F16L 1/26; F16L 1/16; F16L 1/18; F16L 1/19; F16L 1/20; F16L 41/021
See application file for complete search history.

(56) References Cited

U.S. PATENT DOCUMENTS

| 4,133,182 A | 1/1979 | Chateau |
| 6,200,068 B1 | 3/2001 | Bath et al. |
| 6,435,771 B1 | 8/2002 | Baugh |

(Continued)

FOREIGN PATENT DOCUMENTS

| GB | 2478548 | 9/2011 |
| GB | 2487578 | 8/2012 |

(Continued)

*Primary Examiner* — Benjamin F Fiorello
*Assistant Examiner* — Stacy N Lawson
(74) *Attorney, Agent, or Firm* — Levy & Grandinetti

(57) ABSTRACT

An in-line accessory structure for a subsea pipeline has an elongate pipe section arranged to be integrated into the pipeline, hence defining a flow axis through the structure. A branch has a lower end in fluid communication with the pipe section and an upper end in fluid communication with a connector hub. The structure further has a subsea foundation such as a mudmat, arranged to support the structure installed orientation. When the structure is in that orientation, the branch inclines inwardly from its lower end toward its upper end in a transverse direction, toward an upright longitudinal plane containing the flow axis.

37 Claims, 8 Drawing Sheets

(56) References Cited

U.S. PATENT DOCUMENTS

| | | | | |
|---|---|---|---|---|
| 8,449,221 B1 * | 5/2013 | Lugo | ............................ | F16L 1/26 |
| | | | | 405/184.3 |
| 8,936,413 B2 * | 1/2015 | Mille | .......................... | F16L 1/26 |
| | | | | 405/172 |
| 9,068,675 B2 * | 6/2015 | Mille | .......................... | F16L 1/18 |
| 2008/0038066 A1 | 2/2008 | Renard et al. | | |
| 2008/0112762 A1 | 5/2008 | van Zandwijk et al. | | |
| 2012/0090414 A1 | 4/2012 | Kearns et al. | | |
| 2012/0298245 A1 * | 11/2012 | Dupre | .......................... | F16L 1/26 |
| | | | | 138/106 |
| 2014/0193205 A1 * | 7/2014 | Parsinejad | ............ | E21B 43/0107 |
| | | | | 405/169 |
| 2015/0337988 A1 | 11/2015 | Huang et al. | | |
| 2018/0031146 A1 * | 2/2018 | Pinho | ........................ | F16L 1/161 |

FOREIGN PATENT DOCUMENTS

| | | |
|---|---|---|
| WO | WO 2011/110950 | 9/2011 |
| WO | WO 2012/101525 | 8/2012 |
| WO | WO 2014/135849 | 9/2014 |
| WO | WO 2014/207560 | 12/2014 |

* cited by examiner

PIPELAYING

BACKGROUND OF THE INVENTION

This invention relates to marine pipelaying when using a pipelaying vessel to lay an offshore pipeline. The invention relates particularly to pipeline accessory structures such as in-line tee assemblies, and to pipelaying systems and methods in which such structures are incorporated into a pipeline during fabrication or installation and are then deployed on the seabed.

Marine pipelaying techniques that involve fabrication of a rigid pipeline on a vessel are generally categorised as either S-lay or J-lay, although variants and hybrids of those techniques have been proposed and used.

The S-lay technique involves welding together successive pipe sections or 'joints' at a series of working stations in a generally horizontal firing line on the deck of a pipelaying vessel, from which the pipeline is launched into the water over a stinger. A series of tensioners grip the pipe to control its movement relative to the vessel under the load of the free span of the pipe extending as a catenary between the vessel and the seabed.

The J-lay technique may be preferred over S-lay when pipelaying in deep and ultra-deep water, particularly with large-diameter pipes. J-lay involves welding single or multiple pipe joints onto the pipe end in a substantially vertical or near-vertical orientation in a J-lay tower on a pipelaying vessel. The pipe is launched downwardly into the water as a catenary as it is formed.

S-lay benefits from a long production line with several working stations, and hence speeds the pipe fabrication process. Thus, where it can be used, S-lay is often preferred to J-lay for its inherently greater lay rate. Recently, this has led to the development of a variant of S-lay known as 'Steep S-lay', which is adapted for deep and ultra-deep water applications where the pipe diameter allows. As its name suggests, Steep S-lay involves setting the lift-off point of the pipe from the stinger as close to vertical as possible. References in this specification to S-lay are intended to encompass Steep S-lay.

Rigid or flexible pipes may also be prefabricated onshore and spooled onto a reel onboard an installation vessel, to be unspooled and laid offshore in a reel-lay operation.

Pipelines are commonly fitted with accessories during fabrication or installation to provide operational flexibility, to create desired field layouts and to support future field extensions.

Such accessories may be disposed at an end of a pipeline or may be inserted within the length of a pipeline, the latter being known in the art as in-line accessories. Pipeline accessories include in-line tee assemblies (ILTs or ITAs), pipeline end manifolds (PLEMs), pipeline end terminations (PLETs), tie-in branches, shutdown valves, pigging connections and other subsea structures.

An in-line structure, commonly an ILT, comprises an accessory mounted on a pipeline between its ends. A typical in-line structure comprises the accessory itself, which may for example comprise a subsea valve and/or connector in fluid communication with a pipe that extends through the structure and is incorporated into the pipeline, and a mechanical support comprising a structural frame and a foundation. As used in the art, 'structure' may refer variously to the entire assembly or just to the structural support frame or any other structural elements that do not convey fluid in use.

Accessories are typically heavy; for example, a subsea valve or connector may weigh more than five metric tons. Thus, an accessory must be supported by a foundation when it is laid on a soft, muddy seabed, as is common in deep and ultra-deep water. The foundation supports the weight of the accessory, keeping the accessory and the attached pipe stable by resisting rotation and excessive lateral movement while also avoiding excessive settlement into the seabed.

A deep-water foundation most commonly comprises one or more mudmats or piles. The present invention is primarily concerned with structures whose foundations comprise mudmats.

A mudmat typically comprises a horizontal top plate, which is usually rectangular and is typically 5 m to 10 m in width and 10 m to 20 m in length. The top plate may optionally be provided with a vertical peripheral skirt, whose depth may be up to about 0.5 m.

The key critical failure mode of a mudmat is overturning. Thus, a mudmat has to cope with the elevated centre of gravity of the accessory it supports and the torque that may be applied by jumpers or spools attached to the accessory when in position for use, while keeping the accessory and the pipe stable without becoming embedded in the seabed.

Some mudmats do not have a peripheral skirt and so are designed to slide across the seabed. Such mudmats thereby accommodate movement of the pipeline caused by factors such as thermal expansion. Other mudmats are fitted with a peripheral skirt, which digs in to the seabed to locate the mudmat against sliding across the seabed. In that case, the structure may instead provide for limited movement of the pipeline and the accessory relative to the mudmat.

In principle, a mudmat should be as long and wide as possible to define a large base area for bearing the weight of the accessory. However, there are limits on mudmat size imposed by considerations of cost, weight and ease of installation.

It will be apparent that pipeline installation is not solely a pipelaying activity but also involves handling and lowering accessories attached to the pipe. Consequently, the overall speed of pipeline installation is not determined simply by the rate at which a vessel can lay pipe but also by the ability of the vessel to install accessories as part of the pipeline. In this respect, a weakness of S-lay is the integration of large accessories into the pipeline, which may need to be installed over the side of the vessel and hence will interrupt the laying operation. J-lay is better suited than S-lay to adding such accessories to the pipeline, which offsets the inherently greater lay rate of S-lay to some extent. However, the J-lay tower of a pipelaying vessel also limits the maximum size of accessories that may be incorporated into the pipeline in J-lay operations.

The ideal solution is to integrate an in-line structure into a pipeline onboard an installation vessel, immediately before pipe lay. In J-lay and reel-lay operations, for example, the structure is lifted into a lay tower and then welded between the catenary and the incoming pipe before overboarding. WO 2006/054891 and WO 2006/089786 teach such methods.

In S-lay operations, however, the structure is welded to the pipeline in the firing line where the pipeline is assembled and then continues along the firing line and over the stinger into the water. The structure has to go over rollers and through tensioners and pipeline manufacturing equipment such as an X-ray testing station, coating stations and other working stations.

In all such pipelaying operations, the main hurdle to overcome is the limited space that is available on board an installation vessel to insert and launch accessory structures. In lay towers used in J-lay or reel-lay operations, a height—that is, a length along the upright pipeline—of less than ten metres may be available. To run through roller boxes over a stinger in S-lay operations, the structure has to be very narrow, typically less than five metres wide. S-lay operations also impose length restrictions on the structure.

To ease the integration of large accessories in pipeline installation operations, a solution is to pass only a part of the accessory structure through open tensioners, grippers or clamps of a pipelaying vessel, and then to assemble the full structure, including mudmats, after or downstream of the tensioners, grippers or clamps. However, there remains a limit to the size of structure that may pass through the tensioners, grippers or clamps; also, the deck layout of the vessel may impose space constraints after the tensioners, grippers or clamps.

Thus, an in-line structure may be installed separately from the pipeline so that only the pipeline and relatively small accessories have to be handled along the firing line or in the lay tower of a pipelay vessel. For example, the structure may be connected to the pipeline on the seabed by pulling pipeline ends toward the structure as in U.S. Pat. No. 4,133,182. In U.S. Pat. No. 6,435,771, the structure is instead connected to the pipeline while the pipeline hangs between the surface and the seabed.

In WO 2011/110950, mudmats are pre-installed on the seabed, for example by a crane, and pipeline accessories are docked with the mudmats upon laying the pipeline across them. However, the pre-installation of mudmats is time-consuming and it can be challenging to land the accessories onto their target mudmats in a subsequent operation. Thus, WO 2014/207560 instead proposes reversing the procedure by installing a mudmat foundation structure and connecting it to a frame carrying the pipeline and accessories only after the pipeline and accessories have themselves been laid.

The prior art methods described above are apt to be used for large structures although they may require the use of multiple vessels with distinct attributes, for example one vessel for pipeline and accessory installation and another for handling the structure or for performing subsea connections. This increases cost by requiring the use of additional marine assets, prolongs an installation operation and increases the risk that the operation could be disrupted by bad weather.

It is also known for pipeline accessories to be fitted with foldable mudmats that are overboarded in a compactly-folded stowed configuration and then opened into a deployed configuration upon, or just before, reaching the seabed. An example of this approach is disclosed in WO 2012/101525, which employs mudmats that swing down from the stowed configuration into the deployed configuration about longitudinal pivot axes that lie generally parallel to the pipe that carries the accessory. WO 2014/135849 describes the alternative of a mudmat that moves generally horizontally by sliding or by pivoting about an upright or vertical axis. The mudmat thereby translates and/or rotates from a compact stowed position under the accessory into a deployed position laterally outboard of the accessory.

The folding, sliding or pivoting mudmat solutions taught by WO 2012/101525 and WO 2014/135849 effectively exploit the available space on a pipelaying vessel by stowing the mudmats compactly to reduce the width of the structure. However, they do not reduce the height of the structure or teach any solution for minimising the length of the structure. Also, the maximum size of an accessory fitted with folding mudmats is still limited to the space that is available around the firing line of the vessel, meaning that the available mudmat area may not be sufficient to support a particularly heavy accessory.

There is a continuing requirement to minimise the size of a mudmat-equipped structure before that structure is launched into the sea and the mudmats are deployed. There is also a continuing requirement to lower the centre of gravity of such a structure to ensure stability as the structure is lowered toward the seabed as part of a pipeline catenary.

BRIEF SUMMARY OF THE INVENTION

It is against this background that the present invention has been devised.

In one sense, the inventive concept resides in an in-line accessory structure for a subsea pipeline, the structure comprising: a subsea foundation arranged to support the structure in an installed orientation; a frame attached to the foundation; an elongate pipe section supported by the frame, the pipe section being arranged to be integrated into the subsea pipeline and hence defining a flow axis through the structure; and at least one branch having a lower end in fluid communication with the pipe section and an upper end in fluid communication with a connector hub. In the installed orientation, the branch inclines inwardly in a transverse direction between its lower end and its upper end, toward an upright longitudinal plane containing the flow axis. Indeed, the branch may intersect the upright longitudinal plane.

The upright longitudinal plane suitably extends substantially orthogonally with respect to a supporting seabed when the structure is in the installed orientation. For example, the upright longitudinal plane may be substantially vertical when the structure is in the installed orientation. Preferably, the pipe section is substantially straight and the flow axis coincides with a central longitudinal axis of the pipe section.

The branch advantageously comprises at least one elbow defining: an upper branch portion that inclines upwardly toward the connector hub and the upright longitudinal plane; and a lower branch portion that inclines downwardly toward the pipe section and the upright longitudinal plane. The lower branch portion may extend laterally outwardly from the pipe section in the transverse direction. The elbow may be, at least in part, laterally outboard of the connector hub in top plan view. However, at least part of the connector hub is preferably laterally inboard of the pipe section in top plan view.

The lower branch portion preferably intersects an upper quadrant of a cross-section of the pipe section. It is also preferred that at least a majority of a circumferential line of intersection between the lower branch portion and the pipe section lies above a central longitudinal axis of the pipe section, and that the circumferential line of intersection is laterally outboard of the upright longitudinal plane.

An elbow may be rotated so that all or part of the associated branch is also inclined in a longitudinal direction.

A valve may be provided in the branch between the pipe section and the connector hub, for example in the upper branch portion between the elbow and the connector hub.

Preferably, the transverse direction is substantially orthogonal to the upright longitudinal plane. For example, the transverse direction may lie in a transverse plane that extends substantially orthogonally with respect to a supporting seabed when the structure is in the installed orientation. Thus, the transverse plane is suitably substantially vertical when the structure is in the installed orientation.

The upright longitudinal plane preferably intersects the connector hub and indeed may substantially bisect the connector hub.

A central longitudinal axis of the connector hub may be substantially parallel to the upright longitudinal plane, and so may be substantially vertical in the installed orientation.

A structure of the invention may comprise first and second branches each having a lower end in fluid communication with the pipe section and an upper end in fluid communication with a respective connector hub, the first and second branches being spaced longitudinally from each other along the pipe section and being disposed on respective mutually-opposed sides of the upright longitudinal plane.

The foundation suitably comprises at least one mudmat that is movable relative to the frame from a compact stowed state into an extended deployed state, in which latter state the mudmat extends in a plane substantially parallel to a supporting seabed when the structure is in the installed orientation. Thus, the plane of the mudmat in the deployed state may be substantially orthogonal to the upright longitudinal plane.

Conveniently, the mudmat is angularly movable around a pivot axis between the stowed and deployed states. In the stowed state, the mudmat is advantageously inclined inwardly toward the upright longitudinal plane, moving upwardly from the pivot axis. In that case, the inclination of the stowed mudmat preferably converges with opposite inclination of the branch about the upright longitudinal plane, which branch extends from an opposite side of the pipe section. The stowed mudmat suitably converges with the opposed branch above the pipe section. Preferably, therefore, a gap between the stowed mudmat and the opposed branch is narrower than the pipe section.

At least one mudmat and at least one branch may be disposed in longitudinal succession along the pipe section on at least one side of the pipe section. For example, at least one mudmat and at least one branch may be disposed in longitudinal succession along the pipe section on each side of the pipe section, the mudmats on opposite sides of the pipe section being offset longitudinally from each other to define longitudinally-extending recesses with opposite longitudinal offset that accommodate the branches on opposite sides of the pipe section.

At least one branch originating from one side of the pipe section may be opposed by a mudmat supported by the frame on the other side of the pipe section.

Advantageously, the or each mudmat is expandible from the stowed state to increase its load-bearing area in the deployed state. For example, the or each mudmat may comprise leaves that are pivotable relative to each other from substantially parallel relation in the stowed state to substanially co-planar relation in the deployed state.

The problem of avoiding excessive bulk of an in-line accessory structure is also solved by such a structure comprising:
- at least one mudmat that is movable relative to the frame from a compact stowed state into an extended deployed state;
- a frame attached to the mudmat;
- an elongate pipe section supported by the frame, the pipe section being arranged to be integrated into the subsea pipeline; and
- a branch in fluid communication with the pipe section;
- wherein at least one mudmat and at least one branch are disposed in longitudinal succession along the pipe on at least one side of the pipe section.

The inventive concept extends to a subsea pipeline comprising at least one in-line structure of the invention.

Preferred embodiments of the invention therefore provide an in-line accessory structure for a subsea pipeline. The structure comprises an elongate pipe arranged to be integrated into the pipeline, hence defining a flow axis through the structure. A branch has a lower end in fluid communication with the pipe and an upper end in fluid communication with a connector hub, optionally via a valve in the branch. The structure further comprises a subsea foundation such as a mudmat, arranged to support the structure in an installed orientation. When the structure is in that orientation, the branch inclines inwardly from its lower end toward its upper end in a transverse direction, toward an upright longitudinal plane containing the flow axis.

In summary, the invention provides a compact in-line subsea structure comprising: a pipeline section; a foundation and structural steel supporting the pipeline section; and at least one lateral piping branch fluidly connected to the pipeline section. The branch comprises at least one valve fluidly connected to at least one connector hub. The branch is permanently inclined in a transverse plane of the structure toward the interior of the structure from the vertical axis. The structure may comprise at least two branches.

One or more branches may be so inclined in a transverse plane of the structure toward the interior of the structure at an angle between 5° and 60° from the vertical axis, preferably between 25° and 40° from the vertical ax is. However, the connector hub preferably has a substantially vertical axis.

The foundation comprises at least one foldable mat section on each side of the pipeline section. At least one of those mat sections may be offset longitudinally to avoid clashing with at least one inclined branch on the same side.

At least one mat section may be in at least two longitudinally-distinct sections to avoid clashing with at least one inclined branch on the same side.

By virtue of the invention, an in-line structure is kept compact to pass along the firing line of the vessel and is less susceptible to disturbance when transiting the splash zone before the mudmats are deployed. Also, the centre of gravity of the structure is kept as low as possible, to the benefit of stability. These advantages allow pipelaying to be performed in higher sea states and so reduce waste of time and hence money while waiting on the weather.

To enable optional expansion of the load-bearing area of a mudmat after movement from a stowed position, the mudmat may comprise relatively-movable leaves or expansion pieces.

A drive mechanism may act to drive movement a mudmat into the deployed position. Gravity may be used to drive or assist deployment and/or expansion of the mudmat.

Mudmats may be secured temporarily in the stowed position during transportation and installation of the in-line structure through the splash zone at least. After deployment, the mudmats may then be locked in the deployed position before or after installation of the accessory at a definitive seabed location.

The invention is most advantageously used in an S-lay operation, although it would also be possible for the invention to be used with benefit in a J-lay or reel-lay operation instead.

BRIEF DESCRIPTION OF THE SEVERAL VIEWS OF THE DRAWINGS

In order that the invention may be more readily understood, reference will now be made, by way of example, to the accompanying drawings in which.

DETAILED DESCRIPTION OF THE INVENTION

Referring firstly to the first embodiment of the invention shown in FIGS. 1 to 7, an in-line structure in the form of an in-line tee or ILT 10 is used to exemplify the invention. The ILT 10 is a transition device that is used on pipelines and flowlines carrying production oil and/or gas and/or water injection fluids.

More specifically, the ILT 10 is a subsea hub for connection to another system, which may for example be a manifold, a wellhead or a PLET. For this purpose, interconnecting subsea pipes, known in the art as jumpers or spools, may be connected at one end to the ILT 10 and at the other end to the other system. Such arrangements are as disclosed in WO 2012/101525 and are well known to those skilled in the art, so need no elaboration here.

The ILT 10 comprises a substantially straight pipe 12 that is installed directly in-line with adjoining sections of a subsea pipeline 14 that incorporates the ILT 10. The pipe 12 and the adjoining sections of the pipeline 14 share a common central longitudinal axis 16.

Pipes that are mounted on the ILT 10, such as the pipe 12, are also known in the art as piping. Piping can connect the pipe 12 to other accessories or equipment of the ILT 10, for example sensors or smaller, 2"-diameter (51 mm) remedial fluid injection branches.

Figure 1:
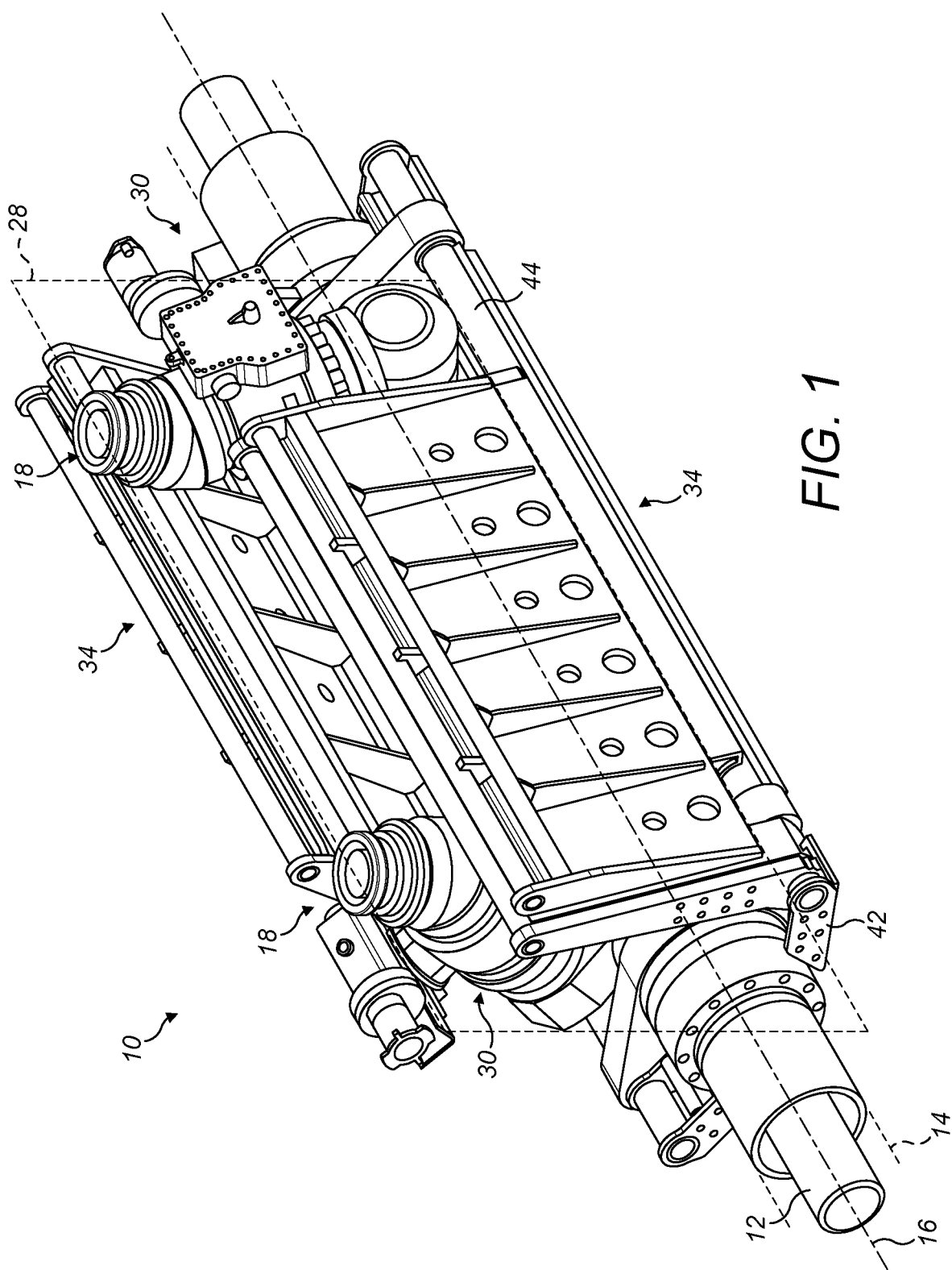
FIG. 1 is a perspective view from above of an in-line structure in accordance with a first embodiment of the invention, with mudmats shown in a folded, stowed state.

The pipeline 14 is represented in dashed lines in FIG. 1 and may be of concentric pipe-in-pipe construction, as may the pipe 12 of the ILT 10. The pipe 12 is most typically connected to the adjoining sections of the pipeline 14 by end-to-end butt welds, although flanged, bolted or threaded couplings could, in principle, be used instead.

Figure 8:
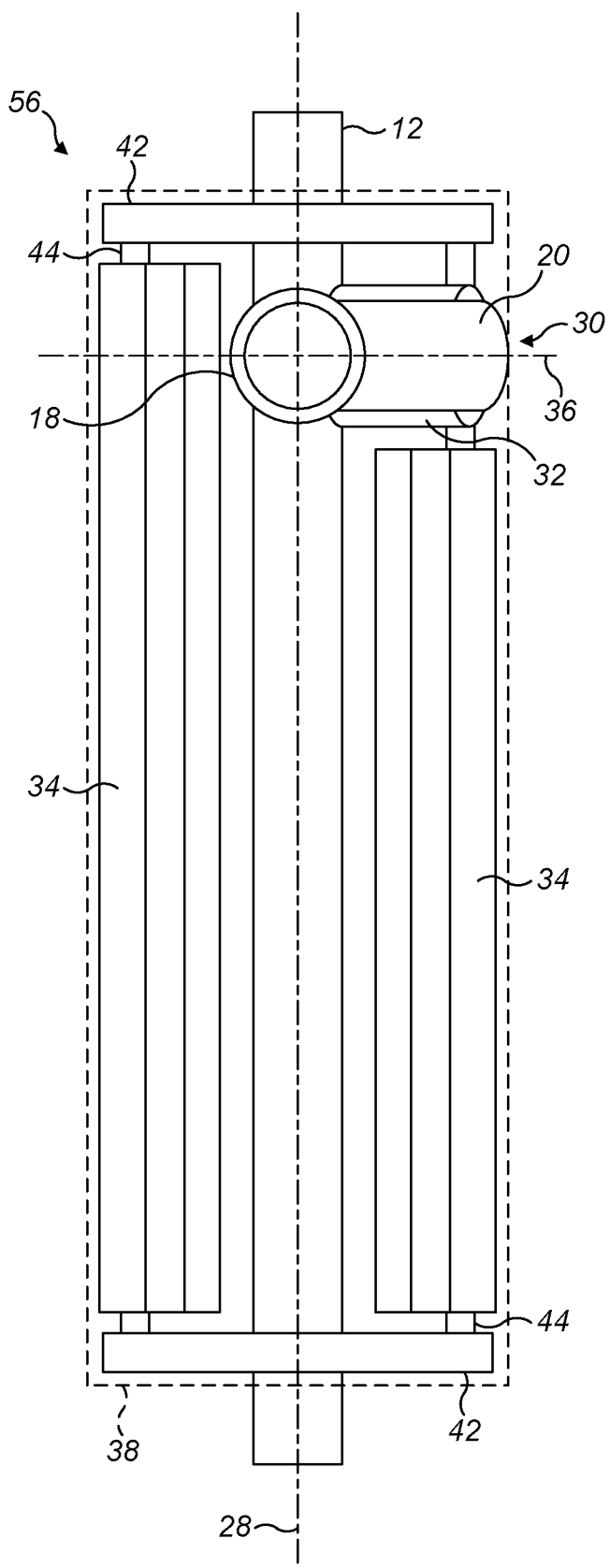
FIG. 8 is a schematic top plan view of a second embodiment of the invention, with the mudmats in a folded, stowed state.
Figure 9:
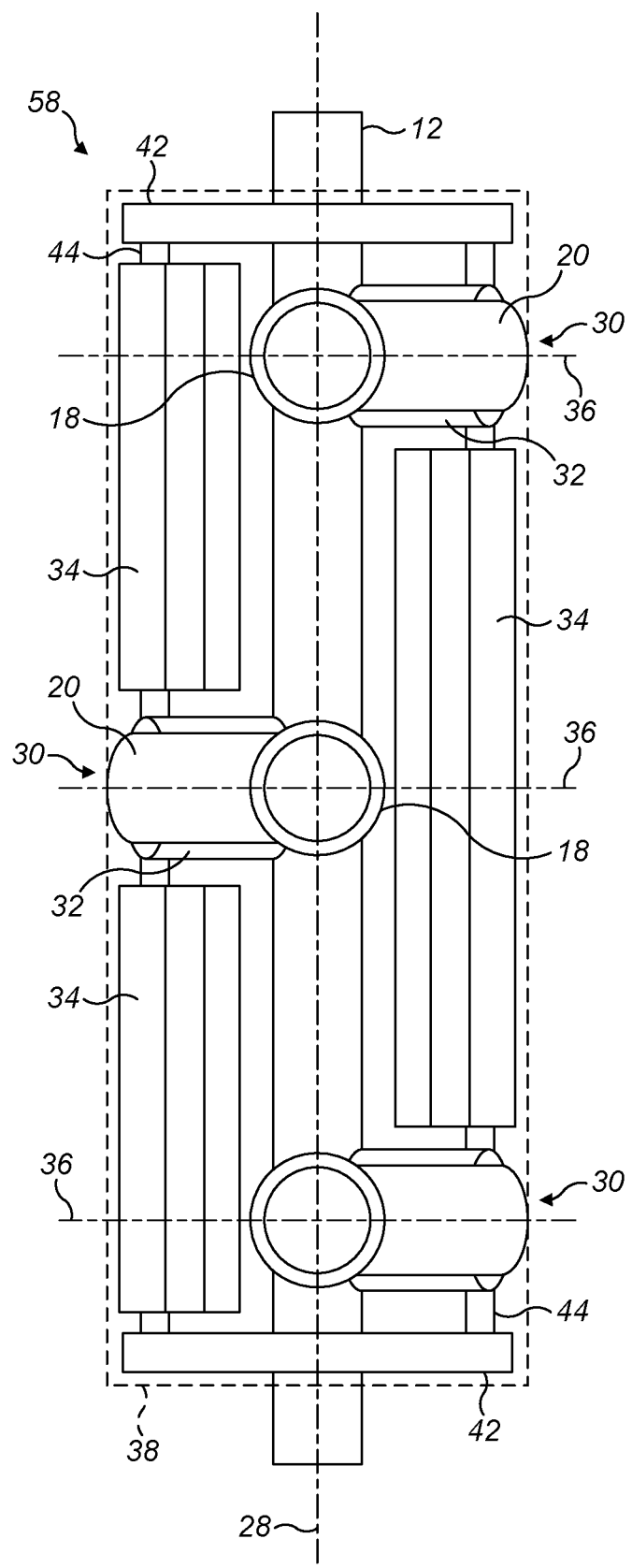
FIG. 9 is a schematic top plan view of a third embodiment of the invention, with the mudmats in a folded, stowed state.

The main functional parts of the ILT 10 are at least one connector hub 18 to connect a jumper or spool to the pipe 12 and at least one valve 20 to control the flow of fluids through the connector hub 18. FIGS. 1 and 3 to 7 show an ILT 10 with two such connector hubs 18 and valves 20. This characterises a double ILT 10 that may be adapted for water injection. FIGS. 8 and 9 show that, in other embodiments, an in-line structure may have only one, or more than two, of such connector hubs 18 and valves 20.

As is conventional, each connector hub 18 protrudes upwardly to a level above the pipe 12 to terminate in an uppermost, upwardly-facing, upwardly-opening interface mouth 22 of circular cross-section. The interface mouth 22 itself is also conventional, containing known coupling formations for engagement with a complementary coupling at an end of a spool or jumper. Also, the interface mouth 22 is surrounded by a rim that lies generally parallel to the seabed, and so lies in a generally horizontal plane, when the ILT 10 has been installed.

Substantially uppermost positioning of the interface mouth 22 with respect to the ILT 10 is beneficial to provide unimpeded access to an unmanned underwater vehicle, such as an ROV, which will typically effect the connection of spools or jumpers to the ILT 10 after installation. Substantially horizontal orientation of the interface mouth 22 is also beneficial, as this facilitates simple insertion into the interface mouth 22 of a coupling at an end of a spool or jumper. Such insertion is best done in a downward direction along a substantially vertical or upright axis, coinciding with a central longitudinal axis 24 of the interface mouth 22.

Figure 2:
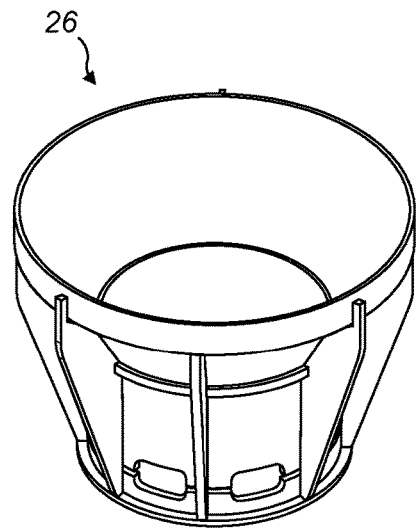
FIG. 2 is an enlarged perspective view of a removable funnel attachment that may be attached to the in-line structure of FIG. 1.

FIG. 2 shows an optional attachment in the form of a guide funnel 26 that can be attached readily to a connector hub 18 after the ILT 10 has cleared height restrictions on the firing line of an installation vessel. The guide funnel 26 is generally frusto-conical to splay upwardly and outwardly from the interface mouth 22, hence guiding insertion into the connector hub 18 of a coupling at an end of a spool or jumper.

As is also known, the interface 22 of each connector hub 18 lies directly above the pipe 12. That is to say, a central longitudinal plane 28 that contains the central longitudinal axis 16 of the pipe 12, and that extends substantially vertically, preferably intersects the interface mouth 22. More preferably, the central longitudinal plane 28 bisects the interface mouth 22. Thus, the central longitudinal axis 24 of the interface mouth 22 lies in substantially the same central longitudinal plane 28 as the central longitudinal axis 16 of the pipe 12. This aligns the connector hubs 18 with the pipe 12 and so avoids the connector hubs 18 exerting a torque about the central longitudinal axis 16 of the pipe 12, either due to their weight or due to forces exerted through them when jumper or spools are coupled to the ILT 10.

Unconventionally, however, the valves 20 do not lie on a straight line between the pipe 12 and the connector hubs 18 as taught by the prior art, which would simply place the valves 20 directly beneath the connector hubs 18 and hence above the pipe 12. Instead, to reduce the overall height of the ILT 10 and also to lower its centre of gravity, each valve 20 is offset laterally to a respective side of the pipe 12 as part of an inclined flow channel or branch 30.

The branch 30 extends through the valve 20 between the associated connector hub 18 and an elbow 32 that communicates with the interior of the pipe 12 through a port in an upper quadrant of a circular-section wall of the pipe 12. In this example, the elbow 32 diverts fluid flow through approximately 90° between the pipe 12 and the branch 30.

An upper portion of the branch 30 extends upwardly from an apex of the elbow 32 toward the connector hub 18, that upper portion being inclined inwardly toward the central longitudinal plane 28. A lower portion of the branch 30 extends downwardly from the apex of the elbow 32 toward the pipe 12, that lower portion also being inclined inwardly toward the central longitudinal plane 28.

The elbow 32 is supported by the pipe 12 and lies to one side of the pipe 12. Advantageously, at least a majority of the port and the elbow 32 lie above the central longitudinal axis 16 of the pipe 12. This reduces the lateral protrusion of the elbow 32 and hence minimises the width of the ILT 10.

The branch 30 inclines laterally inwardly toward the central longitudinal vertical plane 28 moving upwardly from the elbow 32 toward the connector hub 18. Thus, the upper end of the branch 30 adjoining the connector hub 18 is above the top of the pipe 12 and is intersected by the central longitudinal plane 28. Conversely, the lower end of the branch 30 adjoining the elbow 32 is below the top of the pipe 12 and lies laterally outside the central longitudinal plane 28. This inclination is most apparent in the end views shown in FIGS. 4 and 6.

In the double ILT 10 shown in FIGS. 1 and 3 to 7, there are two branches 30 disposed to respective mutually-opposed sides of the pipe 12. This helps to balance the weight of the branches 30 and elbows 32 about the pipe 12 and so avoids exerting any significant net torque about the central longitudinal axis 16 of the pipe 12. The branches 30 and the associated connector hubs 18 and elbows 32 are, however, offset longitudinally to a considerable extent, one branch 30 being near one end of the pipe 12 and the other branch 30 being near the other end of the pipe 12.

Figure 3:
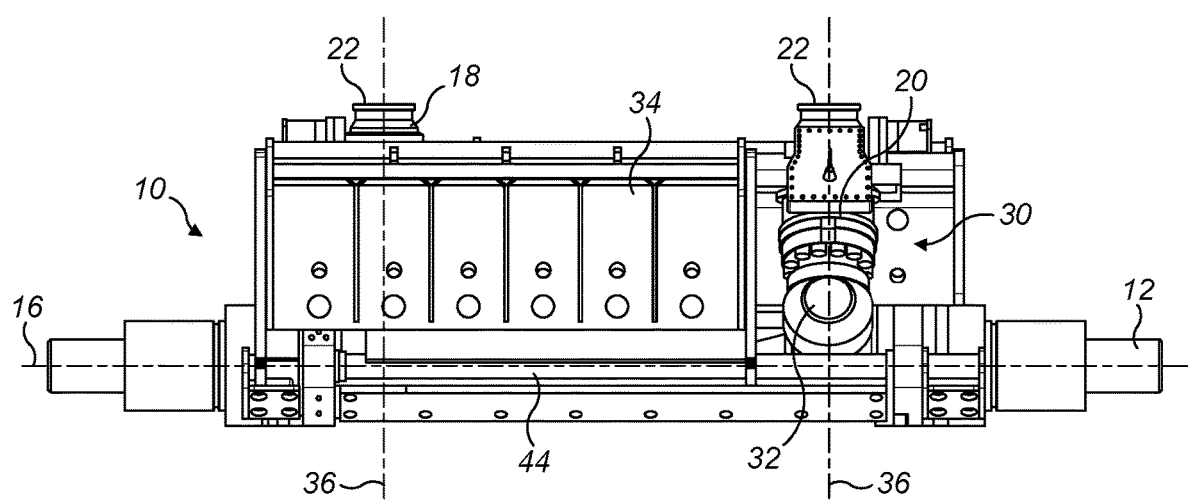
FIG. 3 is a side view of the in-line structure as shown in FIG. 1.

As is best apparent in the side view of FIG. 3, each branch 30 extends substantially vertically; hence, there is substantially no, or at least substantially less, inclination of the branch 30 in a longitudinal or axial direction with respect to the ILT 10. There could be substantial longitudinal or axial inclination of the branch 30 in some variants of the invention, for example if it is desirable to lengthen the branch 30 to accommodate certain equipment on the branch 30. However, the arrangement shown in the drawings is preferred as it maximises longitudinal space for a folded mudmat 34 to be offset longitudinally on the same side of the pipe 12, as will now be explained.

The ILT 10 must support hardware attached to the pipe 12, such as the connector hubs 18 and valves 20, and must resist rotation and lateral movement while also avoiding excessive settlement into the seabed. The weight of the ILT 10 must not be supported by the pipe 12 itself once on the seabed, but must instead be supported by mudmats 34. The mudmats 34 have to cope with the raised centre of gravity of the ILT 10 and the torque applied by laterally-offset jumper or spools, while keeping the ILT 10 and the pipe 12 stable without becoming embedded in the mud of the seabed.

Figure 4:
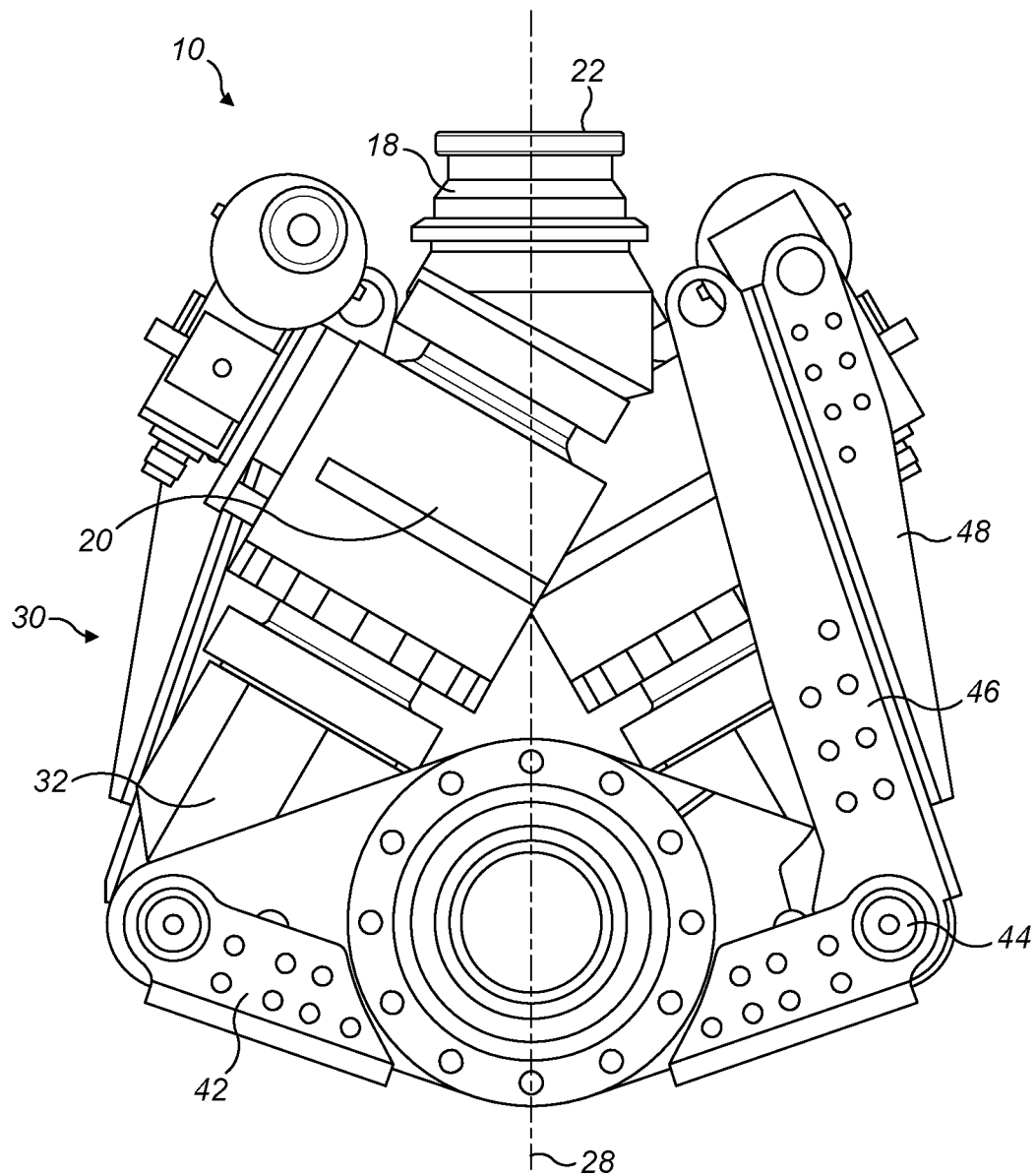
FIG. 4 is an enlarged end view of the in-line structure as shown in FIGS. 1 and 3.

The ILT 10 shown in FIGS. 1 and 3 to 7 features two mudmats 34, one to each side of the pipe 12. When folded as shown in FIGS. 1, 3 and 4, both mudmats 34 are spaced laterally or radially outwardly from the pipe 12 with minimal clearance between them so as to minimise the overall width of the ILT 10.

Both mudmats 34 are substantially the same size in this example, which again helps to balance their weight about the pipe 12 and so avoids exerting any significant net torque about the central longitudinal axis 16 of the pipe 12. However, reflecting the marked longitudinal offset of the branches 30 and the associated connector hubs 18 and elbows 32, the mudmats 34 are also offset longitudinally from each other but in an inverse sense. Thus, a branch 30 faces an end of each mudmat 34, with one branch 30 facing one end of one mudmat 34 and the other branch 30 facing the opposite end of the other mudmat 34.

Figure 7:
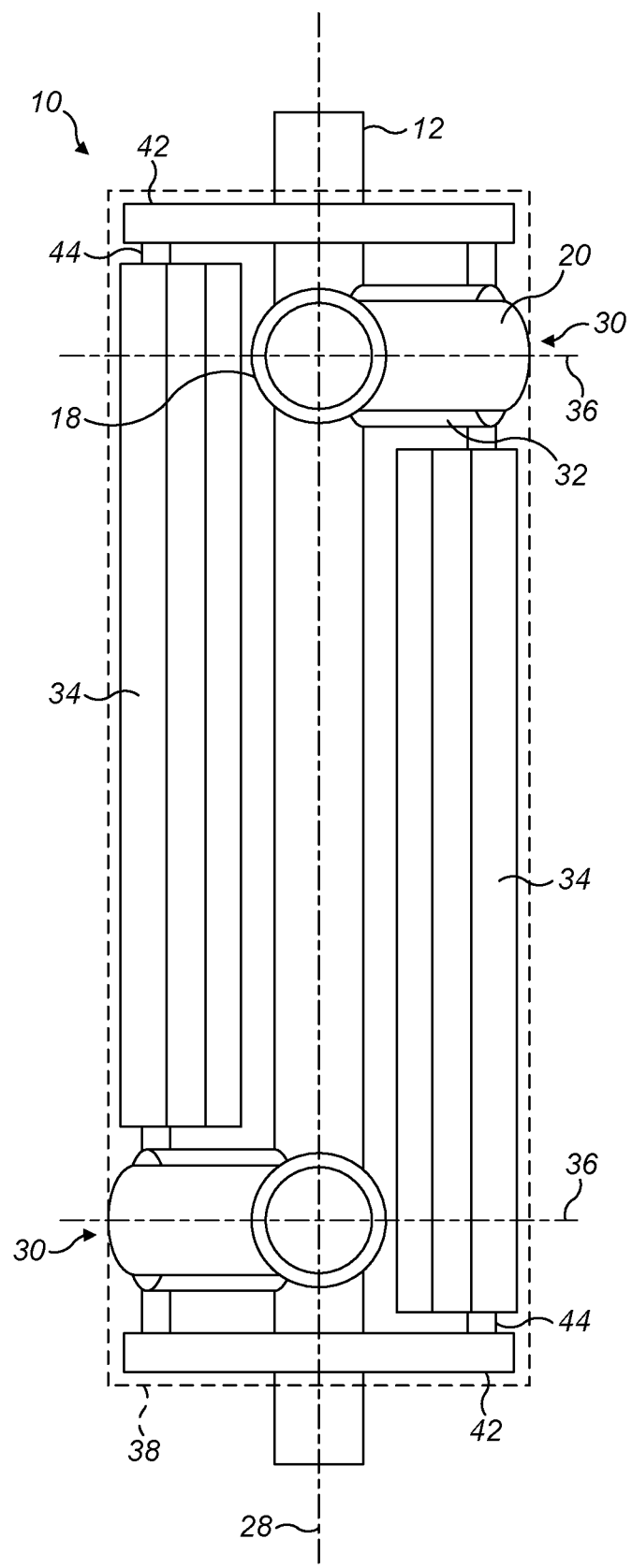
FIG. 7 is a schematic, simplified representation of the in-line structure of the first embodiment, shown in top plan view with the mudmats in a folded, stowed state as in FIGS. 1, 3 and 4.

The effect of the respective longitudinal offsets of the branches 30 and mudmats 34 is best appreciated in the top plan view of FIG. 7, which represents the ILT 10 in a simplified, schematic way. It will be apparent from FIG. 7 that a lateral or transverse plane 36 extends substantially vertically through the centre of each connector hub 18, hence including the central longitudinal axis 24 of the interface mouth 22. The transverse planes 36 are orthogonal to the central longitudinal plane 28 that contains the central longitudinal axis 16 of the pipe 12. Each transverse plane 36 passes through a branch 30 on one side of the pipe 12 and a mudmat 34 on the directly opposite side of the pipe 12.

Thus, neither mudmat 34 lies radially outside a branch 30 on the same side of the pipe 12. This allows the mudmats 34, when folded, to lie closely against the outside of the pipe 12 and does not add the thickness of the folded mudmats 32 to the width of the branches 30 to, disadvantageously, increase the width of the ILT 10.

Viewed another way, the opposed longitudinal offsets of the mudmats 34 provide longitudinally-offset, longitudinally-extending recesses or spaces on the respective sides of the pipe 12. Those spaces accommodate the branches 30, including the valves 20, and the associated elbows 32. The effect is to minimise the width of the ILT 10 and also its length when the mudmats 34 are folded, as represented by the envelope 38 shown in dashed lines in FIG. 7.

The mudmats 34 are supported by a support frame 40 attached to the pipe 12. The support frame 40 comprises laterally-extending cross-members 42 attached to the pipe 12 near respective ends of the pipe 12, longitudinally outboard of the branches 30. The support frame 40 further comprises longitudinally-extending pivot members 44. The pivot members 44 are generally parallel to and spaced from the pipe 12, being parallel to and spaced from each other on respective sides of the pipe 12.

Figure 5:
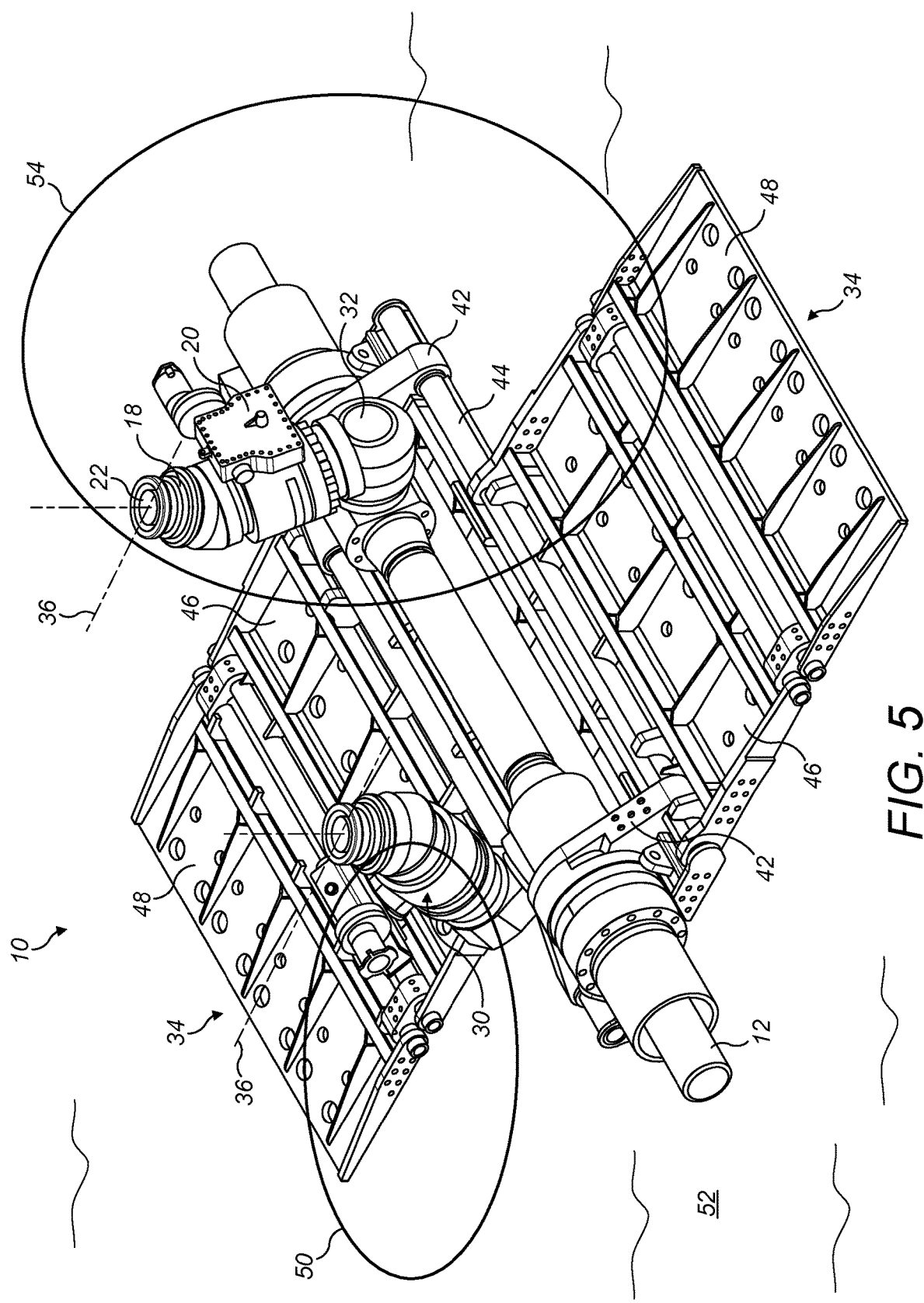
FIG. 5 is a perspective view of the in-line structure shown in FIGS. 1, 3 and 4 but with the mudmats now in an unfolded, deployed or extended state.
Figure 6:
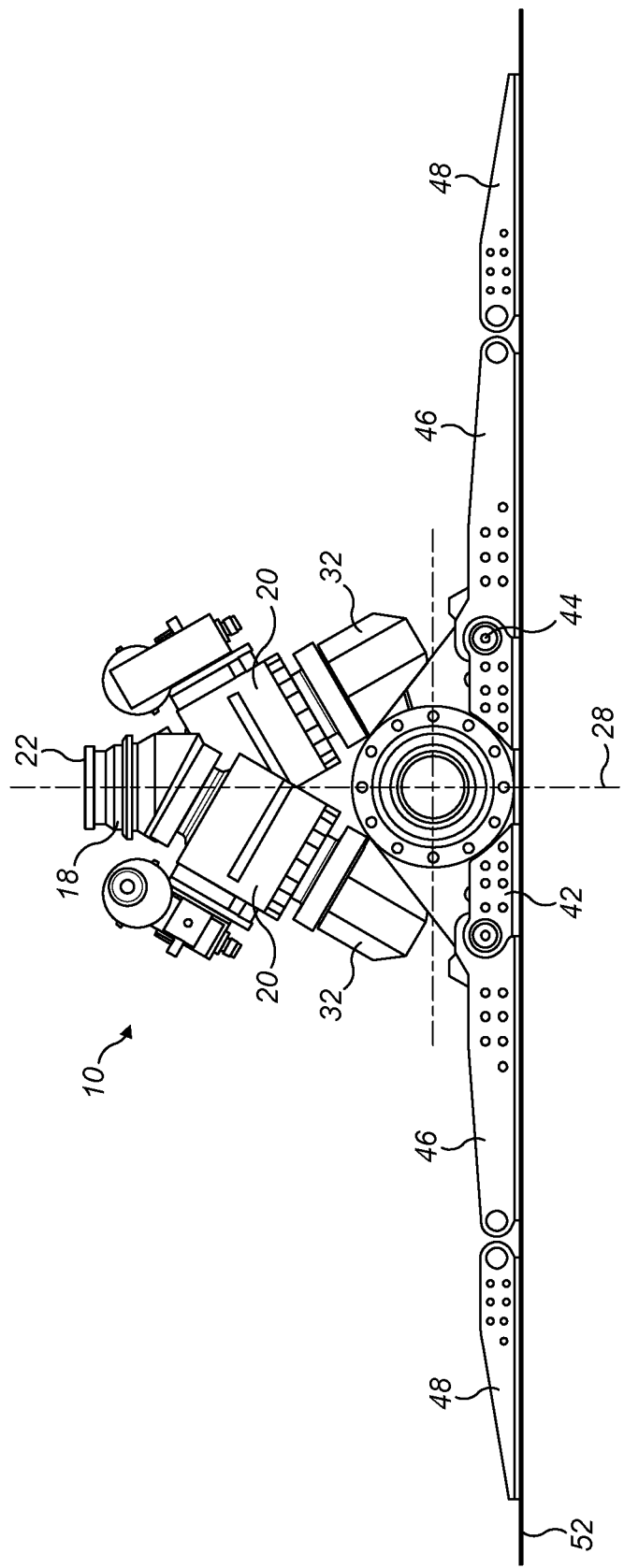
FIG. 6 is an end view of the in-line structure as shown in FIG. 5.

The pivot members 44 join the cross-members 42 on their respective sides of the pipe 12 to define pivot axes about which the mudmats 34 swing down from the folded, stowed position shown in FIGS. 1, 3 and 4 to the unfolded, substantially horizontal deployed position shown in FIGS. 5 and 6.

As the mudmats 34 are shortened longitudinally to provide space at one or both ends for branches 30 and elbows 32 on the same side of the pipe 12, it is beneficial for the load-bearing area of each mudmat 34 to be extensible as the mudmat 34 moves from the stowed to the deployed position. In this example, such extension involves lateral extension achieved by dividing each mudmat 34 into bi-folding leaves.

Specifically, each mudmat 34 has an inner leaf 46 that is double-hinged to an outer leaf 48 about a pivot axis that lies parallel to, and outboard of, the associated pivot member 42. Ellipse 50 in FIG. 5 emphasises the double-hinge mechanism between the leaves 44, 46 of the mudmats.

The inner and outer leaves 46, 48 are both substantially planar on their undersides. When a mudmat 34 is folded into the stowed position as best seen in the end view of FIG. 4, the outer leaf 48 hangs laterally outside the inner leaf 46 with their undersides close to parallel. Both leaves 46, 48 of the mudmat 34 are then inclined inwardly toward the central longitudinal plane 28, moving upwardly from the pivot member 42.

Thus, when a mudmat 34 is folded, the leaves 46, 48 are disposed face-to-face in an inclined stack. The inclination of the stack converges with the opposed inclination of a branch 30 that extends from the opposite side of the pipe 12 to overlap the central longitudinal plane 28. The stacked leaves 46, 48 converge with the opposed branch 30 above the pipe 12, leaving a gap between the folded mudmat 34 and the branch 30 that is substantially narrower than the width of the pipe 12.

It will also be noted from FIG. 4 that the leaves 46, 48 of the folded mudmat 34 lie compactly within the width of the ILT 10 defined by the elbow 32 of a branch 30 on the same side of the pipe 12.

On deployment of the mudmat 34, the inner leaf 46 pivots about the pivot member 44 into a substantially horizontal plane. Simultaneously, the outer leaf 48 pivots in an opposed sense relative to the inner leaf 46 in a gull-wing movement as the outer leaf 48 also approaches a substantially horizontal plane. Eventually the underside of the outer leaf 48 reaches substantially horizontal planar alignment with the underside of the inner leaf 46 to lie on the seabed 52, as best seen in FIG. 6.

The ILT 10 is now ready for coupling with jumpers or spools via the connector hubs 18 as explained above. In this respect, ellipse 54 in FIG. 5 shows the notably unhindered access afforded for ROVs to interact with the connector hubs 18 when the mudmats 34 have been unfolded and deployed.

In principle, the mudmats 34 may be deployed at any time in the installation process after the ILT 10 has cleared any equipment on an installation vessel that may restrict lateral clearance. In practice, however, deployment of the mudmats 34 will typically take place just before, or just after, landing the ILT 10 on the seabed 52.

Finally, as noted above, FIGS. 8 and 9 show that an in-line structure such as an ILT may have only one, or more than two, sets of connector hubs 18 and their associated equipment. In those figures, like numerals are used for like features.

Specifically, FIG. 8 shows an ILT 56 being a second embodiment of the invention having one connector hub 18 and FIG. 9 shows an ILT 58 being a third embodiment of the invention having three connector hubs 18. In each of those embodiments, each connector hub 18 is associated with a respective branch 30, valve 20 and elbow 32, all suitably having the characteristics described above for the first embodiment. Each of those embodiments also features mudmats 34, shown here in a folded state, that are supported by a support frame 40 comprising transverse cross-members 42 and longitudinal pivot members 44.

In FIG. 8, the single branch 30, comprising the valve 20, and the associated elbow 32 lie to only one side of the pipe 12 of the ILT 56. The mudmat 34 on that side of the pipe 12 is shortened longitudinally to leave a longitudinally-extending gap at one end, between the mudmat 34 and a cross-member 42, to accommodate the branch 30 and the elbow 32. The mudmat 34 on the other side of the pipe 12 is longer and extends along substantially the full length of the ILT 54 between the cross-members 42.

FIG. 9 shows the ILT 58 fitted with three branches 30, each with an associated valve 20 and elbow 32. First and second branches 30 situated inboard of the cross-members 42 near respective ends of the pipe 12 lie to one side of the pipe 12. A mudmat 34 extends longitudinally between the first and second branches 30 on the same side of the pipe 12. The third branch 30 is centred longitudinally between the first and second branches 30 and lies to the other side of the pipe 12. Further mudmats 34 on the same side of the pipe 12 as the third branch extend longitudinally away from the third branch 30 in opposite directions toward respective ends of the pipe 12, to terminate inboard of the cross-members 42.

Many other variations are possible without departing from the inventive concept. For example, there could be more than one pipe extending along the in-line structure to carry production fluids or other fluids, along with other parallel elongate elements to carry power and/or data.

A release and drive mechanism may be provided to unlatch the mudmats for deployment and to drive their movement from the stowed position into the deployed position. A suitable release system may comprise ROV-releasable latches acting between the mudmats and the support frame or between the mudmats and the pipe when the mudmats are in the stowed position. Drive may be effected in various ways, such by a rack-and-pinion system, by hydraulics or by a spring-loaded system, and may be assisted by gravity.

Extending the load-bearing area of the mudmats during deployment can be achieved in ways other than unfolding of multiple leaves. For example, the mudmats could have a folding inner leaf pivotably attached to the support frame in the manner described, and one or more sliding or pivoting outer leaves that translate and/or rotate relative to the inner leaf while remaining largely in the plane of the inner leaf. The principle of operation could be similar to that described in the aforementioned WO 2014/135849. However, in this case, the outer leaf of a mudmat would move relative to a folding inner leaf, rather than moving an entire mudmat relative to an accessory support platform as proposed in WO 2014/135849.

The elbows 32 could be rotated so that all or part of the branch 30 is also tilted inwards or outwards in the longitudinal direction, hence adapting the inner bore of the elbow 32 to make a wye fluid connection rather than a tee.

The invention claimed is:

1. An in-line accessory structure for a subsea pipeline, the structure comprising:
   a subsea foundation arranged to support the structure in an installed orientation;
   a frame attached to the foundation;
   an elongate pipe section supported by the frame, the pip section being arranged to be integrated into the subsea pipeline and hence defining a flow axis through the structure; and
   at least one branch having a lower end in fluid communication with and facing forward the pipe section and an upper end in fluid communication with and facing forward a connector hub;
   wherein, in the installed orientation, the branch inclines inwardly and upwardly in a transverse direction between its lower end and its upper end, toward an upright longitudinal plane containing the flow axis and extending substantially orthogonally with respect to a supporting seabed.

2. The structure of claim 1, wherein the branch intersects the upright longitudinal plane.

3. The structure of claim 1, wherein the upright longitudinal plane is substantially vertical when the structure is in the installed orientation.

4. The structure of claim 1, wherein the pipe section is substantially straight and the flow axis coincides with a central longitudinal axis of the pipe section.

5. The structure of claim 1, wherein the branch comprises at least one elbow defining:
   an upper branch portion that inclines upwardly toward the connector hub and the upright longitudinal plane; and
   a lower branch portion that inclines downwardly toward the pipe section and the upright longitudinal plane.

6. The structure of claim 5, wherein the lower branch portion extends laterally outwardly from the pipe section in the transverse direction.

7. The structure of claim 5, wherein the elbow is, at least partially, laterally outboard of the connector hub in top plan view.

8. The structure of claim 7, wherein at least part of the connector hub is laterally inboard of the pipe section in top plan view.

9. The structure of claim 5, wherein the lower branch portion intersects an upper quadrant of a cross-section of the pipe section.

10. The structure of claim 9, wherein at least a majority of a circumferential line of intersection between the lower branch portion and the pipe section lies above a central longitudinal axis of the pipe section.

11. The structure of claim 10, wherein the circumferential line of intersection between the lower branch portion and the pipe section, is laterally outboard of the upright longitudinal plane.

12. The structure of claim 1, further comprising a valve in the branch between the pipe section and the connector hub.

13. The structure of claim 5, further comprising a valve disposed in the upper branch portion between the elbow and the connector hub.

14. The structure of claim 1, wherein the transverse direction is substantially orthogonal to the upright longitudinal plane.

15. The structure of claim 14, wherein the transverse direction lies in a transverse plane that extends substantially orthogonally with respect to a supporting seabed when the structure is in the installed orientation.

16. The structure of claim 15, wherein the transverse plane is substantially vertical when the structure is in the installed orientation.

17. The structure of claim 1, wherein the upright longitudinal plane in the connector hub.

18. The structure of claim 17, wherein the upright longitudinal plane substantially bisects the connector hub.

19. The structure of claim 1, wherein a central longitudinal axis of the connector hub is substantially parallel to the upright longitudinal plane.

20. The structure of claim 19, wherein the central longitudinal axis of the connector hub is substantially vertical in the installed orientation.

21. The structure of claim 1, wherein the at least one branch comprises first and second branches each having a lower end in fluid communication with the pipe section and an upper end in fluid communication with a respective connector hub, the first and second branches being spaced longitudinally from each other along the pipe section and being disposed on respective mutually-opposed sides of the upright longitudinal plane.

22. The structure of claim 1, wherein the foundation comprises at least one mudmat that is movable relative to the frame from a compact stowed state into an extended deployed state, in which latter state the mudmat extends in a plane substantially parallel to a supporting seabed when the structure is in the installed orientation.

23. The structure of 22, wherein the lane of the mudmat in the deployed states, is substantially orthogonal to the upright longitudinal plane.

24. The structure of claim 22, wherein the mudmat is angularly movable around a pivot axis between the stowed and deployed states.

25. The structure of claim 24, wherein, in the stowed state, the mudmat is inclined inwardly toward the upright longitudinal plane, moving upwardly from the pivot axis.

26. The structure of claim 25, wherein the inclination of the stowed mudmat converges with opposite inclination of the branch about the upright longitudinal plane, which branch extends from an opposite side of the pipe section.

27. The structure of claim 26, wherein the stowed mudmat converges with the opposed branch above the pipe section.

28. The structure of claim 27, wherein a gap between the stowed mudmat and the opposed branch is narrower than the pipe section.

29. The structure of claim 22, wherein at least one of the mudmats and at least one of the branches are disposed in longitudinal succession along the pipe section on at least one side of the pipe section.

30. The structure of claim 29, wherein the at least one of the mudmats and the at least one of the branches are disposed in longitudinal succession along the pipe section on each side of the pipe section, the at least one of the mudmats on opposite sides of the pipe section being offset longitudinally from each other to define longitudinally extending recesses with opposite longitudinal offset that accommodate the at least one of the branches on opposite sides of the pipe section.

31. The structure of claim 22, wherein at least one of the branches originating from one side of the pip section is opposed by one of the mudmats supported by the frame on the other side of the pipe section.

32. The structure of claim 22, wherein the or each mudmat is expandable from the stowed state to increase its load-bearing area in the deployed state.

33. The structure of claim 32, wherein the or each mudmat comprises leaves that are pivotable relative to each other from substantially parallel relation in the stowed state to substantially co-planar relation in the deployed state.

34. A subsea pipeline comprising at least one in-line structure as defined in claim 1.

35. An in-line accessory structure for a subsea pipeline, the structure comprising:
at least two mudmats that are attached to and movable relative to a frame from a compact stowed state into an extended deployed state;
an elongate pipe section supported by the frame, the pipe section being arranged to be integrated into the subsea pipeline; and
at least two branches in fluid communication with the pipe section; wherein at least one of the mudmats and at least one of the branches are disposed in longitudinal succession along the pipe section on each side of the pipe section, the at least one mudmat on opposite sides of the pipe section being offset longitudinally from each other to define longitudinally-extending recesses with opposite longitudinal offset that accommodate the at least one branch on opposite sides of the pipe section.

36. The structure of claim 35, wherein the at least one of the branches originating from one side of the pipe section is opposed by the at least one of the mudmats supported by the frame on the other side of the pipe section.

37. A subsea pipeline comprising at least one in-line structure as defined in claim 35.

* * * * *